J. J. BIASIOLLI.
VETERINARY APPARATUS.
APPLICATION FILED MAY 11, 1915.

1,150,848.

Patented Aug. 24, 1915.

Witnesses
E. D. B. Brown

Inventor
J. J. Biasiolli,
By E. H. Bond
Attorney

UNITED STATES PATENT OFFICE.

JOSEPH J. BIASIOLLI, OF SAN ANTONIO, TEXAS.

VETERINARY APPARATUS.

1,150,848.  Specification of Letters Patent.  Patented Aug. 24, 1915.

Application filed May 11, 1915. Serial No. 27,384.

*To all whom it may concern:*

Be it known that I, JOSEPH J. BIASIOLLI, a citizen of the United States, residing at San Antonio, in the county of Bexar and State of Texas, have invented certain new and useful Improvements in Veterinary Apparatus, of which the following is a specification.

This invention relates to certain new and useful improvements in veterinary apparatus of that class designed for use in administering medicines to horses or other animals and it has for its objects among others to provide an improved, simple and efficient device in the form of a bridle attachment whereby the medicine to be administered runs from the receptacle, the flow being checked at any time the animal does not swallow the medicine, thereby enabling me to avoid waste of time or medicine in the ministration of the latter.

It has for a further object to provide a device of this nature composed of few parts and those readily assembled and also easily detachable for repairs or other purposes.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1:
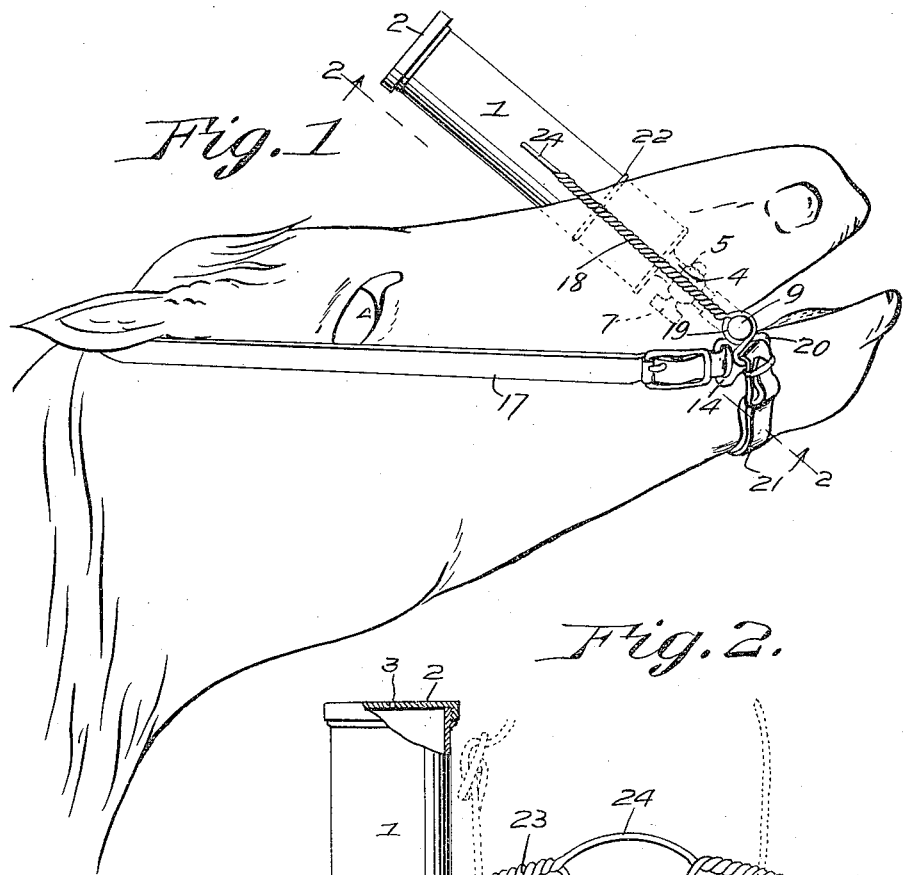
Figure 2:
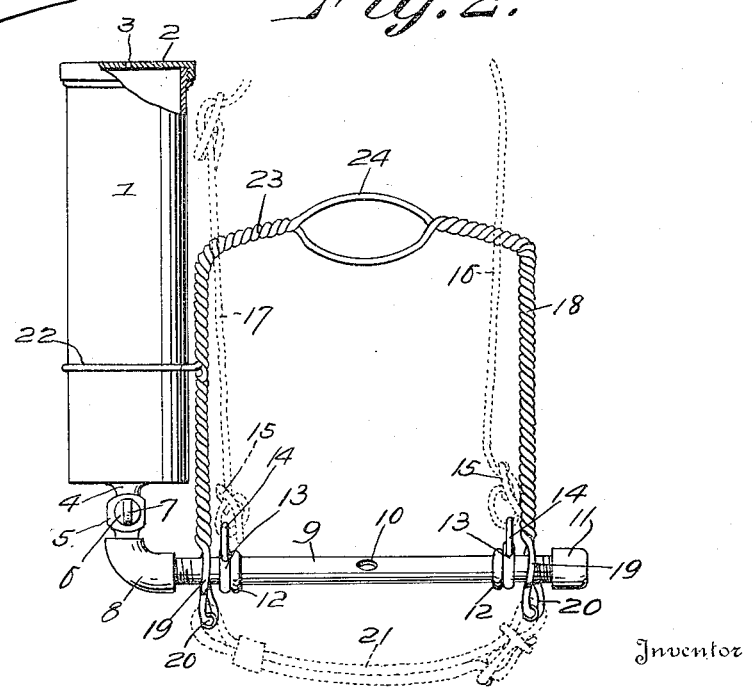

Figure 1 is a perspective view showing the application of the invention. Fig. 2 is a view looking in the direction of the arrows on the line 2—2 of Fig. 1.

Like numerals of reference indicate like parts throughout the different views.

Referring to the drawings, 1 designates a receptacle for containing the medicament. It is provided with a detachable cap 2 provided with a suitable vent 3 for an obvious purpose. From the lower end of this receptacle, which may be of any suitable material, shape and capacity, there extends a nipple or the like 4 supporting a valve chamber 5 in which is rotatably mounted a valve 6, the stem of which is provided with a suitable handle or thumb piece 7, as shown, whereby it may be readily turned to check or control the flow of the liquid from the receptacle 1.

8 is an elbow detachably mounted upon the member 4 and into this elbow is screwed one end of the pipe 9 which is provided with suitable means for the discharge of the liquid, such, for instance, as the hole 10 which may be of any desired size, or character. The other end of the pipe is closed by a cap 11 screwed thereon, as shown in Fig. 2.

The pipe 9 is provided near each end with a collar or the like 12 and upon the pipe and limited in their movements toward each other by the said collars 12 are the rings 13 which are provided with the eyes or the like 14 in which are adjustably held, by means of suitable buckles or the like 15, the members 16 and 17 of the bridle.

18 is a twisted wire frame having loops or the like 19 which loosely receive the pipe 9 and between which and the collars 12 the rings 13 of the bridle are retained about said pipe. The wire constituting this frame is bent upon itself to form the eyes 20 into which are secured the ends of the strap 21 adapted to extend under the chin of the animal, as seen in Fig. 1. This frame has a portion of the wire of which it is composed extended laterally to form a ring or loop 22 which encircles the receptacle 1, as seen best in Fig. 2, to retain the same in proper relation with the frame.

The upper cross bar 23 of the twisted wire frame may be provided with a loop or the like 24 to constitute a handle to aid in the manipulation of the device.

From the foregoing description when taken in connection with the annexed drawings, the mode of application will be readily understood. Briefly stated, it is as follows:—The device is applied to the head of the animal, as seen in Fig. 1, the receptacle 1 being filled with the medicine which it is desired to administer, the pipe 9 being placed between the jaws of the animal, as shown in Fig. 1, and the valve 6 turned so as to allow the liquid to flow from the receptacle into the pipe 9 from whence it is discharged into the mouth of the animal. In use, the receptacle is held in an inclined position, as indicated in Fig. 1, so that the medicine gravitates or runs out readily, and while the device is held with one hand by means of the cross bar 23 or the handle 24 thereof, the other hand is free to manipulate the valve 6 to control the flow of the liquid or to entirely shut off the flow when it is found that the animal is not swallowing the medicine, thus preventing waste of the latter. The parts are connected to constitute the complete apparatus and there is no liability of separation or derangement of the parts nor injury thereto.

Modifications within the scope of the claims in details may be resorted to without departing from the spirit of the invention or sacrificing any of its advantages.

What is claimed as new is:—

1. A device of the class described comprising a frame having a cross portion constituting a handle, and substantially parallel portions, a pipe revolubly supported in said parallel portions, an attaching strap connected with said pipe, a chin strap connected with the parallel portions of the frame and a receptacle mounted upon said pipe and supported by said pipe and frame.

2. A device of the class described comprising a frame having a cross portion and parallel portions with loops, a pipe supported in said loops, eyes on said loops, a chin strap engaged with said eyes, rings on said pipe, an attaching strap connected with said rings, and a receptacle supported by said frame and with which said pipe communicates.

3. A device of the class described comprising a frame having a cross portion and parallel portions with loops, a pipe supported in said loops, eyes on said loops, a chin strap engaged with said eyes, rings on said pipe, an attaching strap connected with said rings, a receptacle supported by said frame and with which said pipe communicates, and means interposed between said receptacle and pipe for controlling the flow of liquid through the latter.

In testimony whereof I affix my signature in presence of two witnesses.

JOSEPH J. BIASIOLLI.

Witnesses:
FRANK P. CHIADO,
J. M. E. GARCIU.

Copies of this patent may be obtained for five cents each, by addressing the "Commissioner of Patents, Washington, D. C."